United States Patent [19]

Kusakawa et al.

[11] 4,020,221
[45] Apr. 26, 1977

[54] THIN FILM DEVICE

[75] Inventors: Hideaki Kusakawa; Kenzoo Takahashi; Shigeki Ikebata, all of Amagasaki, Japan

[73] Assignee: Mitsubishi Denki Kabushiki Kaisha, Tokyo, Japan

[22] Filed: Dec. 3, 1975

[21] Appl. No.: 637,113

Related U.S. Application Data

[63] Continuation of Ser. No. 455,352, March 27, 1974, abandoned.

[30] Foreign Application Priority Data

Mar. 28, 1973 Japan .............................. 48-35307

[52] U.S. Cl. ............................ 428/166; 428/178; 428/194; 428/201; 428/209; 428/210; 428/433
[51] Int. Cl.² ...................... B32B 3/00; B32B 3/12
[58] Field of Search .......... 428/195, 201, 209, 210, 428/433, 178, 194; 427/108, 109, 123, 124

[56] References Cited

UNITED STATES PATENTS

| 1,642,557 | 9/1927  | Reynolds  | 428/210 |
| 2,729,583 | 1/1956  | Sadowsky  | 428/210 |
| 2,962,409 | 11/1960 | Ludlow    | 428/210 |
| 3,177,345 | 4/1965  | Plumat    | 427/108 |
| 3,395,040 | 7/1968  | Pritchard | 427/108 |
| 3,526,541 | 9/1970  | Peltzer   | 427/108 |
| 3,585,088 | 6/1971  | Schwuttke | 427/108 |
| 3,586,533 | 6/1971  | Cudert    | 427/108 |
| 3,757,322 | 9/1973  | Barkar    | 427/108 |
| 3,821,999 | 7/1974  | Guess     | 428/210 |

Primary Examiner—Michael F. Esposito
Attorney, Agent, or Firm—Wenderoth, Lind & Ponack

[57] ABSTRACT

A thin metallic film is superposed on a light transmitting, dielectric substrate through a lattice-shaped, electric conductor disposed on the substrate to maintain it spaced away from the latter. The film is provided on the exposed surface with a lattice-shaped electric rib and fixed at the periphery to the substrate by a binder.

4 Claims, 1 Drawing Figure

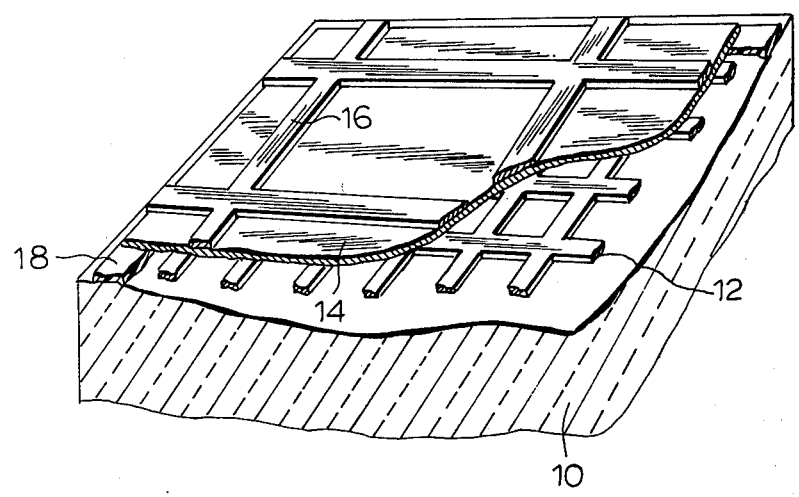

THIN FILM DEVICE

This is a continuation of application Ser. No. 455,352, filed Mar. 27, 1974, now abandoned.

BACKGROUND OF THE INVENTION

This invention relates to a thin film device for use in displaying images with a beam of electrons.

There haven been recently developed image display devices of the type called a "light valve." Light valves include a layer formed of a dielectric material such as an oil of the paraffin series or a thermoplastic resin and adapted to be irradiated with a beam of electrons making the layer uneven. By putting the layer with the unevenness in an optical system utilizing the schlieren method, an image can be formed with visible light. Alternatively the image may be magnified. When irradiated with a beam of electrons in a valcum, oils of the paraffin series or thermoplastic resins are decomposed either to evolve gases or to deteriorate the performance of the devices. Thus such light valves have had disadvantages in that the dielectric film involved is always required to be held in a vacuum by using a vacuum pump and the film has a short usable life.

In order to eliminate these disadvantages, there have been already proposed thin film devices of the type including a plurality of strip-shaped electric conductors evaporatively deposited on a glass substrate and a thin metallic film disposed on the substrate through those conductors. According to the principles of light valves employing the thin film device as above described, a beam of light from a source of light falls upon a collimating lens to be formed into a parallel beam of light. Then the parallel beam of light is reflected from the thin film device positioned on a front surface of an evacuated enclosure including therein an electron gun. The beam of light reflected from the thin film device is incident upon a projection lens to be focussed on a stop. However that portion of light reflected from the uneven area of the thin film device forms an image on the associated projection screen, without its passage through the stop.

In addition thin devices have been previously produced, by way of trail, by filling spaces between strip-shaped electric conductors disposed on the glass substrate with a resin and evaporatively depositing a thin metallic film upon the conductors and resinous portions there-between. Thereafter the resin has been removed from the device by means of a solvent therefor. In order to remove the resin from the device, it has been required to form openings in the thin metallic film. For example, a construction has been actually produced, by way of trial, including a plurality of strip-shaped electric conductors disposed in spaced parallel relationship on a glass substrate and a thin metallic film in the form of spaced parallel strips connected orthogonally to the electric conductors. In such a construction, it has been difficult to completely remove the resin from between the thin metallic film and the glass substrate. If that thin film device was used in an image display device, that portion of the resin left between the film and substrate could be decomposed upon the irradiation by a beam of electrons, resulting in both the deterioration of the performance and a decrease in the useful life of the device. If the strip-shaped thin metallic film had a decreased width to widen the openings in the metallic film in order to completely remove the resin from the film and substrate, then light would be transmitted through the widened openings with no effect. This does not contribute to the display of images and therefore leads to a loss of brightness of the resulting images that is one of the characteristic features of light valves. Also the strip-shape construction of the thin metallic film decreases the mechanical strength in the lateral direction thereof although no problem occurs in the longitudinal direction thereof. This has resulted in the disadvantages that the thin metallic film easily disengages from the conductors at the junctions therebetween and the junctions are easily broken. Only the thin film devices as above described could be produced heretofore.

In order to eliminate these disadvantages, the present applicants have previously proposed a thin film device comprising a substrate formed of a dielectric material having a light transmitting property, a plurality of electrically conducting strips disposed in rows and columns on the dielectric substrate to form a lattice thereon and a thin metallic film having no gap over the entire area thereof and superposed on the conducting lattice with the metallic film fixed at the periphery to the substrate. Since the resulting device has one surface the entire area of which is formed of the thin metallic film, the device can reflect substantially 100% of a quantity of light from the associated source of light falling thereon and be effectively utilized to display images. Thus it serves to produce images with a high brightness. The device does not exhibit the undesirable effect of resin remaining therein because resin is not used to fill the spaces between the conducting strips during the production of the device. Also the device can be used for a long time because the thin metallic film has no gap and excellent mechanical strength.

However, upon producing the device, the thin metallic film preliminarily prepared by an evaporation technique is merely superposed on the conducting strips pretruding from the dielectric substrate while being bonded to the substrate at the periphery no bombarded with a beam of electrons. In other words, the thin metallic film is not bonded to the conducting strips. In operation, each square enclosed with the adjacent portions of the conducting strips above the dielectric substrate is projected, as one elementary area of an image, on a projecting screen. In this case, an increase in contrast of the image affects the adjacent portion of the metallic film resulting in a decrease in resolving

SUMMARY OF THE INVENTION

Accordingly it is an object of the present invention to eliminate the disadvantages of the prior art practice as above described.

It is another object of the present invention to provide a new and improved thin film device including a thin metallic film having no gap over the entire area thereof and therefore no directivity as to the mechanical strength as well as having both a high efficiency of reflection and a high resolving power.

The present invention accomplishes these objects by the provision of a thin film device comprising a substrate formed of a dielectric material having a light transmitting property and a thin metallic film having an electrically conducting rib, preferably in the form of a lattice, disposed on at least one surface thereof.

The thin metallic film is preferably connected to the dielectric substrate through the electrically conducting rib engaging the dielectric substrate to form a space therebetween.

Alternatively that surface of the thin metallic film having no rib disposed theron may be connected to one surface of the dielectric substrate through an electrically conducting protrusion disposed on the one surface of the substrate whereby a space is formed between the film and the substrate.

BRIEF DESCRIPTION OF THE DRAWING

The present invention will become more apparent from the following detailed description taken in conjunction with the accompanying drawing in which the single FIGURE is a fragmental perspective view, with parts broken away of a thin metallic film device constructed in accordance with the principles of the present invention with parts broken away.

DESCRIPTION OF THE PREFERRED EMBODIMENTS

Referring now to the drawing, it is seen that the arrangement disclosed herein comprises a substrate 10 formed of a dielectric material having a light transmitting property, for example, glass, a plurality of electrically conducting strips 12 disposed in rows and columns on one surface of the substrate 10 to form a lattice thereon, and a thin metallic film 14 superposed on the substrate 10 through the electrically conducting lattice 12 to form therebetween, elementary spaces arranged in a checker board. The thin metallic film 14 is shown as including a rib 16 of electrically conducting material having longitudinal and lateral portions protruding from the exposed surface thereof forming a lattice. The film 14 has the other surface flat and contacting the electrically conducting lattice 12. The thin metallic film 14 is fixed at the periphery to the substrate 10 by a bonding agent 18.

The electrically conducting rib 16 is preferably formed on the thin metallic film 14 by on evaporation technique. If desired, the rib 16 may be produced on the film 14 by plating or machining. Also the rib 16 may be comprised of dots disposed in rows and columns or strips disposed in spaced parallel relationship or the like.

Further thin metallic film 14 may be superposed on the dielectric substrate 10 so that an electrically conducting rib such as rib 16 disposed on that surface thereof facing the substrate 10 contacts the substrate, in which case is the lattice 12 is omitted. It is to be noted that the rib now disposed on the film 14 should form squares substantially equal in size to those formed by the lattice 12. If desired, the rib 16 can be omitted. Although such an arrangement is not illustrated, it is to be understood that the same is within the scope of the present invention.

The present invention has several advantages. For example, due to the use of the thin metallic film which has no gap over the entire area thereof, the device has mechanical strengths in all directions, and has both a efficiency of reflection and a high resolving power. The device can be manufactured with a very small number of manufacturing steps and with a high yield but without the necessity of relying on skillful technique. Further the device is fit for use for a long time.

While the present invention has been described in conjunction with a few preferred embodiments thereof it is to be understood that various changes and modifications may be resorted to without departing from the spirit and scope of the present invention.

What we claim is:

1. A thin film device for displaying images impressed thereon by a beam of electrons, consisting essentially of a substrate formed of a dielectric material having a light transmitting property, and a single unitary thin metallic film having protrusions as a structural part thereof and on one surface of said thin metallic film, said protrusions being in contact with said dielectric substrate to position said thin metallic film in said spaced superposed relationship therewith, the edges of said film being secured to said substrate.

2. A thin film device as claimed in claim 1 wherein said protrusions are in the form of a lattice.

3. A thin film device for displaying images impressed thereon by a beam of electrons consisting essentially of a substrate formed of a dielectric material having a light transmitting property, electrically conducting protrusions disposed on said dielectric substrate, and a single unitary thin metallic film having one surface having no protrusions thereon being in contact with said protrusions on said substrate, said film having protrusions as a structural part thereof and on the surface thereof facing away from said substrate, the surface of said thin metallic film having no protrusions being maintained in spaced superposed relationship with said substrate by said protrusions on the substrate, the edges of said film being secured to said substrate.

4. A thin film device as claimed in claim 3 wherein said protrusions on said dielectric substrate are in the form of a lattice and wherein said protrusions on said thin metallic film are in the form of a lattice.

* * * * *